April 5, 1932.　　　　C. E. MAYNARD　　　　1,852,085

METHOD OF CURING FLAPS FOR PNEUMATIC TIRE CASINGS

Filed Dec. 5, 1929

INVENTOR.
Charles Edgar Maynard.
BY
ATTORNEY.

Patented Apr. 5, 1932

1,852,085

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

METHOD OF CURING FLAPS FOR PNEUMATIC TIRE CASINGS

Application filed December 5, 1929. Serial No. 411,802.

My invention relates to a method of vulcanizing or curing rubber flaps, such as are used in pneumatic tire casings.

It is customary in the manufacture of rubber flaps to extrude the rubber material in lengths or lengths having a cross-sectional shape approximating that desired in the finished article. If individual annular or endless flaps are desired, suitable lengths are cut, the ends spliced and the annulus placed on a ring or former of the desired dimensions and cross-sectional curvature and the flap cured on the ring. If long lengths of cured material are desired, strips of proper length are wound into a suitably shaped spiral groove formed on a drum and the strips similarly cured. Whichever form the flap takes it is necessary that the stock hug the former snugly during the cure and this is accomplished by tensioning the stock as it is placed on the former.

It is found that certain rubber compounds, which it is in some cases desirable to use in the manufacture of these flaps, lack sufficient elasticity in the uncured state with the result that when such stocks are stretched onto the ring or drum formers they take a permanent elongation so that the desired snug fit on the curing former is not secured. During the initial part of the cure such stocks also tend to sag under their own weight, further loosening the material on the form.

It is the object of my invention to overcome the above-mentioned difficulties and provide a method of curing stocks which lack elasticity in their uncured state on the conventional rings and drums.

I have found that sufficient elasticity may be imparted to these normally inelastic uncured stocks by a partial vulcanization or cure and broadly stated my method comprises partially curing the stock under conditions such that substantially no distorting tension or mechanical pressure is applied to the stock and complete support is afforded the stock whereby sagging or permanent elongation is avoided.

My invention will now be more specifically described with reference to the accompanying drawings which illustrate one embodiment of my invention.

Figure 1:
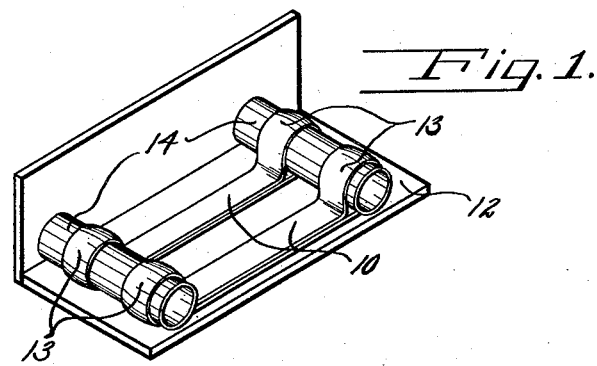
Fig. 1 is an isometric figure showing the first step of my method applied to the curing of endless or annular flaps.
Figure 2:
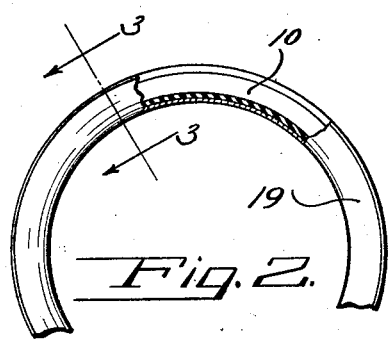
Fig. 2 is a view, partially broken away, showing the ring or former used in curing endless flaps.
Figure 3:
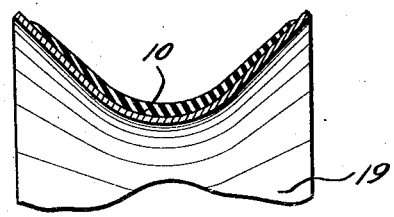
Fig. 3 is a view taken on line 3—3 of Fig. 2.
Figure 4:
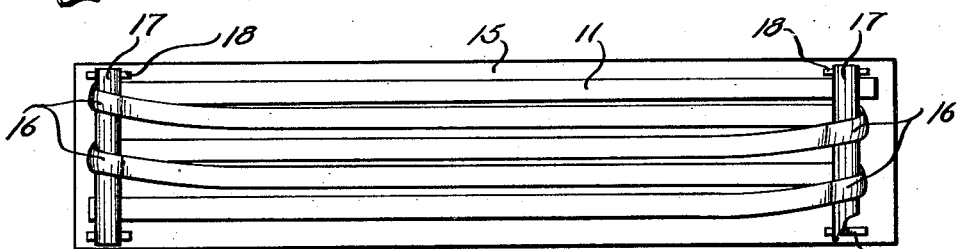
Fig. 4 is a view corresponding to Fig. 1, showing the first step in curing long lengths of flap material.
Figure 5:
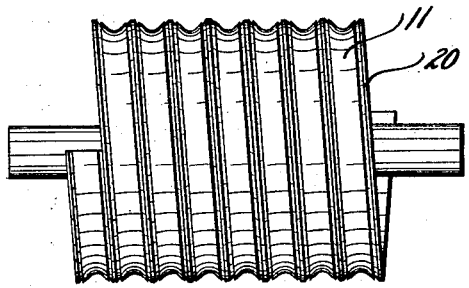
Fig. 5 is a view of the former or drum used in curing long lengths of flap material.

In the drawings, Figs. 1 and 4 illustrate the first step in my method, the flap material being shown in endless form at 10 in Fig. 1 and in long lengths at 11 in Fig. 4. In the endless form (Fig. 1) the extruded stock is cut to length, spliced and placed on trays 12, the looped ends 13 of the flaps being supported by bars 14, these bars preventing sharp folds being formed of the looped ends during curing. Bars 14 are spaced from the bottom of the trays sufficiently to permit the stock to be freely positioned between the bar and the tray.

The long lengths of flap material 11 are treated the same as the endless flaps 10, being looped over a tray 15 (Fig. 4), the looped ends 16 being supported by bars 17. These bars do not rest on the material 11 but are raised as by blocks 18 so that no weight is placed on the stock.

The material on the trays is placed in a heater or vulcanizer and given a short preliminary cure, such as a three minute rise to a sixty pound steam pressure. This time limit and pressure may be varied for varying stocks, but the cure must be of such length as to prevent blistering of the material but not long enough to give the material a permanent set which cannot be removed or changed during subsequent heating. The flap material is then cooled in the vulcanizer by cold water or allowed to cool in the air. This short preliminary cure imparts to the material sufficient coherence and elasticity that with subsequent heating it will no longer take a permanent elongation under reasonable tension or stretch under its own weight as heretofore.

The material is now placed on the formers, the endless flap 10 on an annular ring former 19 and the long lengths 11 on a spiral shaped former 20 under sufficient tension to cause the stock to hug the former, and again returned to the heaters where it is given a long enough second heat to complete the cure.

By my method a large variation in compounding is made possible to meet various requirements in the properties or character of the finished product.

Having thus described my invention, I claim:

1. The method of curing rubber flap material which comprises giving the partially formed uncured material a short open heat cure while the material is completely supported and untensioned, and giving the material a finish cure while positioned on formers under tension.

2. The method of curing rubber flap material which comprises giving the partially formed uncured material a partial open heat cure, while the material is completely supported and untensioned, of sufficient length to impart elasticity to the material and to prevent blistering but short of a permanent setting cure, and finally giving the material a finish cure while positioned on formers under tension.

3. The method of curing rubber flap material which comprises giving the material a partial open heat cure, while the material is completely supported and untensioned, of sufficient length to impart elasticity to the material and to prevent blistering but short of a permanent setting cure, and finally giving the material a finish cure while positioned on formers under tension.

4. The method of curing rubber flap material which comprises giving the material a partial open heat cure, the degree of which is such to obviate flow of the rubber under subsequent curing and leaving the material flexible and elastic, and giving the material a subsequent finishing cure when positioned on formers.

5. The method of curing rubber flap material which comprises looping the material on trays, supporting the looped ends thereby preventing sharp folds being formed at these ends, giving the material when so positioned a partial cure, cooling the partially cured material, placing the cooled material on formers under tension, and giving the material a finish cure.

6. The method of curing rubber flap material which comprises looping the material on trays, supporting the looped ends thereby preventing sharp folds from being formed at these ends, giving the material a partial cure the degree of which is such to obviate flow of the rubber under subsequent curing and leaving the material flexible and elastic, cooling the partially cured material, placing the cooled material on formers under tension, and giving the material a subsequent finish cure.

CHARLES EDGAR MAYNARD.